O. A. PARKER.
WHEEL FOR VEHICLES.
APPLICATION FILED JAN. 3, 1916. RENEWED APR. 3, 1920.

1,357,723.

Patented Nov. 2, 1920.

INVENTOR,
Orel A. Parker,
Hull, Smith, Brock & West
BY
ATTYS.

UNITED STATES PATENT OFFICE.

ORREL A. PARKER, OF CLEVELAND, OHIO.

WHEEL FOR VEHICLES.

1,357,723.  Specification of Letters Patent.  Patented Nov. 2, 1920.

Application filed January 3, 1916, Serial No. 69,713. Renewed April 3, 1920. Serial No. 371,142.

*To all whom it may concern:*

Be it known that I, ORREL A. PARKER, a citizen of the United States, residing at Cleveland, in the county of Cuyahoga and State of Ohio, have invented a certain new and useful Improvement in Wheels for Vehicles, of which the following is a full, clear, and exact description, reference being had to the accompanying drawings.

In my pending application Serial No. 29,690 there is disclosed a vehicle wheel structure a characteristic feature of which is that a rim is attached directly to the ends of spokes by means of devices located within the hollow ends of the spokes and adapted to engage the rim to force the same laterally and outwardly against seats provided at one side of the outer ends of the spokes.

For the sake of appearance, and for other reasons, it may be desirable to provide a rim with a felly, or a structure having the appearance of a felly, which is or may be similarly fastened to the ends of the spokes. This will give a heavier appearance to the wheel than when no felly is used, and also has certain advantages with respect to the strength and rigidity of the parts.

The locking devices employed are somewhat similar to those disclosed in the application referred to, but the structure may be varied in this respect and also in respect to the particular rim and felly structure hereinafter described.

The present invention therefore embodies a rim provided in the present instance with a sheet metal felly, which may be considerably lighter than an ordinary felly, and this felly seats upon the ends of hollow spokes to which it is fastened by locking devices which as shown are contained mainly within the ends of the spokes and which may be projected to engage the felly.

Figure 1:
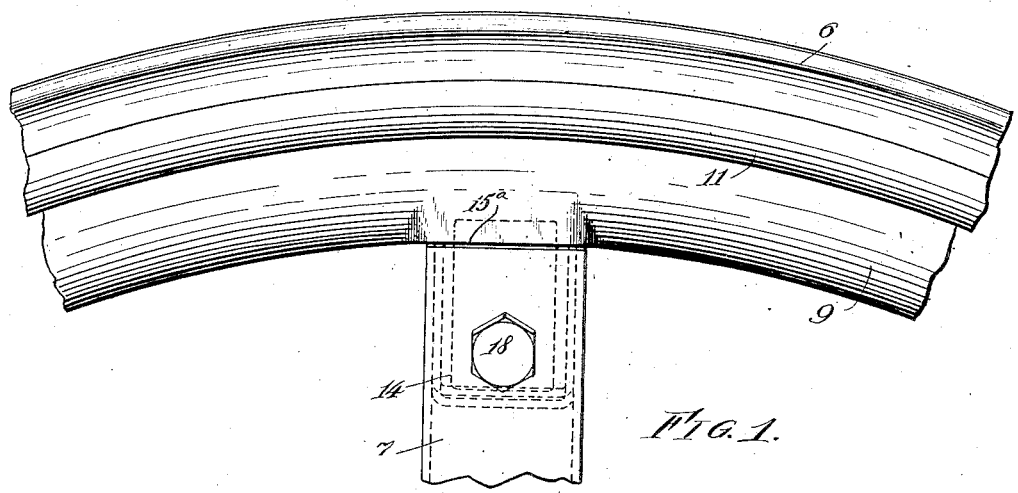
Figure 2:
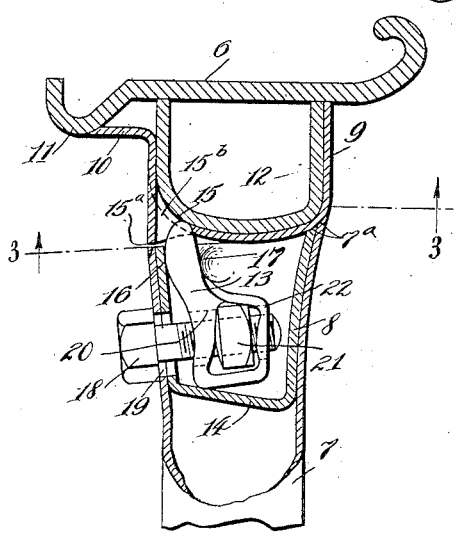
Figure 3:
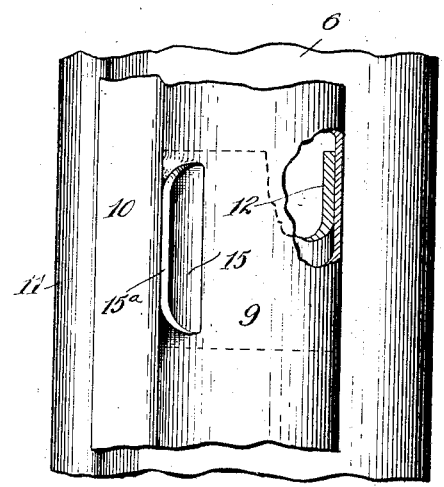
Figure 4:
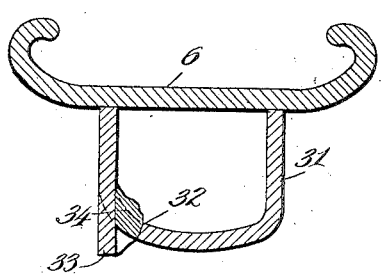

In the accompanying drawings, Figure 1 is a side elevation of a portion of a wheel containing the invention; Fig. 2 is a longitudinal section through the end of a spoke, with the rim thereon; Fig. 3 is an inside elevation of a part of the rim and felly; and Fig. 4 is a cross section of a modification of the rim and felly.

In the drawings, 6 indicates a rim, which may be of the type shown or any other type desired, and 7 indicates one of the hollow spokes, preferably made of sheet metal. Within the outer end of each spoke is a cup or recessed member 8, which may be made of sheet metal and which is welded or otherwise secured in the end of the spoke.

To the inner side of the rim is fastened a felly 9 which may be made of light sheet metal rolled or spun to shape, and this felly extends around the inner periphery of the rim to which it is fastened in any suitable manner. As shown, one edge or flange of the felly is extended outwardly, as at 10, to fit against the grooved bead or flange 11 which receives the locking ring of the tire (not shown). This ring 9 forms, in effect, a false felly, having the appearance of an ordinary wooden or metal felly, but which also serves as a strengthening member for the rim.

Opposite the end of each spoke the felly is provided with a comparatively heavy U-shaped reinforcing strip 12 which fits within the same and abuts at its flanged ends against the inner surface of the rim 6. These reinforcing strips serve to strengthen the felly and the rim at the end of each spoke and to sustain the weight thereon as well as the pressure of the locking devices.

In the present embodiment, each locking device comprises a member 13 contained within the cup 8 and resting at its inner end against the inclined bottom 14 of the cup, and adapted to have its outer end projected into engagement with the curved or inclined wall 15 of the reinforcing strip 12, the felly being cut away to expose such wall and the metal at one side of such cut being pressed outwardly to form a radially extending lip or flange 15$^a$ which overhangs the outer edge of the spoke end and provides a notch or recess 15$^b$ into which the toe of the member 13 may project. The locking member has a sliding and turning movement in the cup, being confined between the side wall 16 thereof and opposed bosses, one of which is indicated at 17, on the adjacent cross walls of the cup. The locking member is actuated by a cap bolt 18 which extends through alined holes 19 in the spoke and cup and through a hole indicated at 20 in the heel of the locking member, with a nut 21 behind said heel. The member 13 has an overhanging part or finger 22 forming with the other part a cage which confines the nut, the opposite sides of which cage are engaged by the nut when the latter is taken up or backed off by the bolt. When the bolt is taken up, the member 13 has a sliding movement outwardly or radially, due to its travel up the incline 14, and also has a turning movement about the bosses 17 on a sliding fulcrum against the side wall 16 of the cup, which causes the toe of the locking member to press outwardly and laterally against the inclined part 15 of the felly. It will be observed that the inner sides of the outer ends of the spoke and cup are cut on a slight curve inclined to the axis of the spoke, forming a lateral seat at $7^a$ and that in consequence of the radial and lateral pressure of the locking member the felly is caused to ride upon and be locked against such seat and that the parts are so constructed that the sides of the felly will be substantially flush with the sides of the spokes when the felly is assembled thereon. The reinforcing strips 12, being located opposite the ends of the spokes, therefore strengthen the felly and the rim at these points and support the weight of the rim as well as the pressure of the locking members.

As shown especially in Figs. 1 and 3, the lips $15^a$, formed by notching the felly in the manner described hereinbefore, are substantially flush with and match the adjacent ends of their respective spokes, the intervening portions of the felly being of the ordinary rounded channel outline.

In the modification shown in Fig. 4, instead of a light metal felly provided with reinforcements at the spokes, a heavy felly 31 is used, preferably made of sheet metal of heavy gage and without the reinforcing strips above described. Such metal will ordinarily be too thick to permit of the formation of a pressed notch or recess therein, as indicated at $15^b$; therefore, in this embodiment the corner of the channel is slit at points opposite the joints with the spokes, and the inner edge of the slit is bent toward the rim, as shown at 32 while the opposite edge is bent away from the rim or toward the center of wheel, as shown at 33, thereby producing a recess or notch to receive the toe of the fastening device in the same manner as described above, said toe bearing against the incline formed by the lip or part 32, for the purpose of locking the rim to each spoke. The projecting lip 33 will stand substantially flush with the surface of the spoke and will serve in a measure to conceal the locking member and close the opening adjacent thereto, in much the same manner as the lips or flanges $15^a$ of the first embodiment accomplish such result. Preferably, also, the lip 32 at the slip is brazed or welded to the adjacent wall of the felly, as shown at 34, to strengthen the lip and close the opening of the felly.

While I have shown and described this invention in connection with a rim having a felly of some sort, it will be evident that certain features thereof are of more general application and hence I do not propose to be limited to the felly type of rim except as such modifications may be positively included in the claims or such inclusion may be rendered necessary by the state of the prior art.

Having thus described my invention, what I claim is:—

1. In a wheel, the combination of a rim, a felly on which the rim is mounted, said felly having notches in the inner surface thereof, spokes having hollow ends on which the felly may be seated, and locking members for said rim within said hollow ends and adjustable to enter said notches.

2. In a wheel, the combination of a rim, a hollow felly within the same, spokes on the ends of which the felly may be seated, fastening devices adapted to press between the spokes and the felly at such ends, and reinforcing members within the felly opposite such spoke ends.

3. In a wheel, the combination of a rim, a felly within the same having inclined surfaces, spokes each having a hollow end with an inclined seat on which the felly may rest, and fastening members movable in said hollow ends and adapted to bear against said inclined surfaces of the felly to press the felly against said seats.

4. In a wheel, the combination of a rim, a hollow metal felly arched in cross section on which the rim is mounted, spokes attached at their outer ends to the felly, and arched reinforcing strips within the felly, at the points of attachment of the spokes.

5. In a wheel, the combination of a rim having a channeled flange adapted to receive a tire holding ring, and a hollow metal felly secured to the rim and having an outstanding flange in supporting contact with the inner side of said channeled flange.

6. In a wheel, the combination of a rim, a hollow metal felly therein having notches with an inclined wall pressed in the inner wall of said felly, spokes on the ends of which the felly may be seated adjacent said notches, and locking members carried by the spokes and adapted to press against the inclined walls of the notches.

7. The combination, with a spoke having a seat, a felly having a reinforcing member secured thereto and adapted to engage said seat, and a locking member adapted to extend between the spoke and the said member and into engagement therewith.

8. The combination, with a spoke having at one side thereof a seat, a rim having a reinforcing member secured thereto and adapted to engage said seat, and a locking member adapted to extend between the opposite side of the spoke and into engagement with such rim and such reinforcing member.

9. The combination, with a spoke having at its end a lateral seat, a rim having a reinforcing member adapted to engage said seat, a locking member adapted to extend between the spoke and the reinforcing member, and a skirt or flange substantially covering the joint between the reinforcing member and the portion of the spoke which is opposite said seat.

10. The combination, with a spoke having at its end a seat, a rim having a reinforcing member adapted to engage said seat, a locking member adapted to engage such spoke end and such reinforcing member, and a skirt or flange substantially covering the joint between the reinforcing member and the portion of the spoke adjacent thereto.

11. The combination, with a spoke having at its end a lateral seat, of a rim having a reinforcing member secured thereto and a hollow metallic felly inclosing the reinforcing member, said felly being adapted to rest upon said seat, a locking member within the outer end of the spoke and adapted to be projected therebeyond on the side opposite such seat, the felly being cut away on the side opposite the seat-engaging portion and having a lip extending radially toward the corresponding side of the spoke end and forming a recess whereinto the locking device may project, and means for moving said device into engagement with the exposed portion of the reinforcing member within such recess.

12. The combination, with a rim provided with a reinforcing member having a lateral seating portion at one side thereof and an inclined surface adjacent the opposite side, a spoke having a hollow outer end provided with a lateral seat for the seating portion of such reinforcement, and a locking member movable within the spoke end on the side which is opposite said seat and adapted to be projected into and out of engagement with the inclined portion.

13. The combination, with a rim provided with a reinforcing member having a lateral seating portion at one side thereof and an inclined surface adjacent the opposite side, a spoke having a hollow outer end provided with a lateral seat for the seating portion of such reinforcement, and a locking member movable within the spoke end on the side which is opposite said seat and adapted to be projected into and out of engagement with the inclined portion of such reinforcing member, said reinforcing member having a lip or flange which is adapted to overhang the side of the spoke opposite the seat and substantially close the joint therewith and to provide a recess whereinto the locking member may be projected.

14. The combination, with a rim provided with a reinforcing member having a pair of laterally spaced seating portions, a spoke having a hollow outer end provided with a lateral seat for one of the seating portions of such reinforcement, and a locking member movable within the spoke end on the side which is opposite said seat and adapted to be projected into and out of engagement with the other seating portion of such locking member.

In testimony whereof I hereunto affix my signature.

ORREL A. PARKER.